F. G. WHEELER.
METHOD OF AND APPARATUS FOR HANDLING CALDRONS.
APPLICATION FILED DEC. 2, 1918.

1,318,634.

Patented Oct. 14, 1919.
2 SHEETS—SHEET 1.

Witnesses:
Robert F. Weir
Arthur W. Carlson

Inventor
Frank G. Wheeler
By Offield Towle Graves & Sloans Attys.

F. G. WHEELER.
METHOD OF AND APPARATUS FOR HANDLING CALDRONS.
APPLICATION FILED DEC. 2, 1918.
1,318,634.
Patented Oct. 14, 1919.
2 SHEETS—SHEET 2.
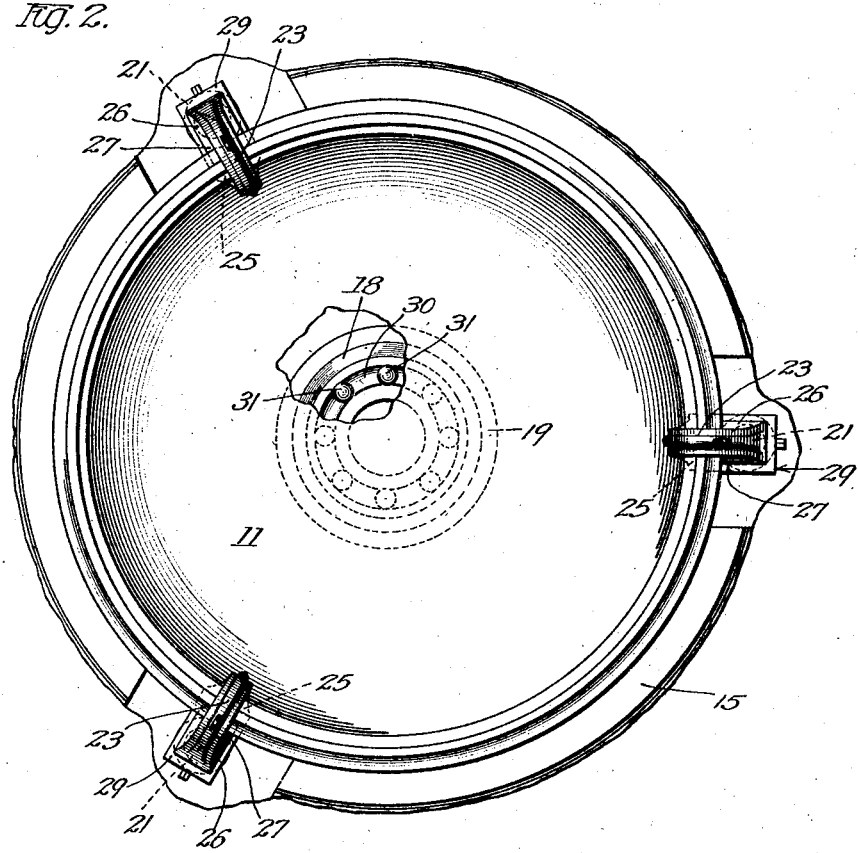
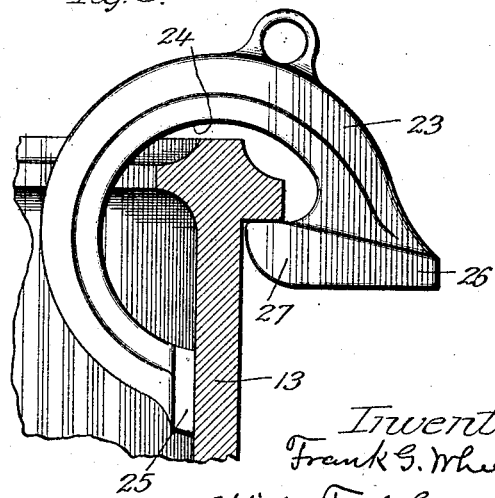

UNITED STATES PATENT OFFICE.

FRANK G. WHEELER, OF APPLETON, WISCONSIN, ASSIGNOR TO BLEACH PROCESS COMPANY, OF APPLETON, WISCONSIN, A CORPORATION.

METHOD OF AND APPARATUS FOR HANDLING CALDRONS.

1,318,634. Specification of Letters Patent. Patented Oct. 14, 1919.

Application filed December 2, 1918. Serial No. 264,978.

*To all whom it may concern:*

Be it known that I, FRANK G. WHEELER, a citizen of the United States, residing at Appleton, in the county of Outagamie and State of Wisconsin, have invented certain new and useful Improvements in Methods of and Apparatus for Handling Caldrons, of which the following is a specification.

My invention relates to improvements in methods of and apparatus for handling caldrons, and has particular reference to the handling of hemispherical caustic pots of large diameter.

In the manufacture of caustic, it is necessary to heat the liquor in large caldrons, which are usually about ten feet in diameter and seven feet deep, each pot weighing about fifteen tons. The pots are heated by means of furnaces, the fire box of the furnace being situated to one side of the pot so that the heating effect is not distributed uniformly over the exterior of the pot. Owing to this uneven heating effect, it is found that one side of the pot oxidizes, burns or wastes away, very rapidly, while the rest of the pot remains substantially intact. Hence, in order to lengthen the life of the caustic pot, it is the practice to rotate these pots on their mountings from time to time in order to present a fresh undamaged surface to resist the wasting-away agencies, while at the same time removing the thin corroded part of the pot to a position where the tendency to corrode or waste away is at the minimum.

Owing to the hemispherical shape of the pot, its great weight and general unwieldy character, great difficulty is obviously encountered in elevating the pot and turning it on its vertical axis from time to time as the pot wears away. Similar difficulty is also experienced in the initial installation of the pot on its setting and in removing the pot after it is completely worn out. Various expedients have been tried out in efforts to devise some cheap and simple method of gripping the pot by its edge or elsewhere in order to lift the same sufficiently to permit of its being handled, but, so far as I am aware, such expedients have uniformly failed of practical results and it has been necessary to provide an expensive overhead traveling crane which can lift the pot centrally from above.

Such traveling crane arrangements for lifting pots weighing fifteen tons each are, together with their supports and associated equipment, relatively quite expensive, considering the short periods during which such cranes are used, and such cost, especially in plants of relatively small capacity, has an important bearing upon the ultimate total cost of the finished product.

The objects of the present invention are to provide a method and means for handling heavy caustic pots of the class described without the aid of overhead traveling cranes; to provide improved means for gripping the pot in order to handle the same from below instead of from above; to provide improved means for supporting the pot while it is being rotated; and, in general, to provide an improved method and means of the character referred to.

In the drawings, which illustrate a preferred embodiment of my invention—

Fig. 2 is a plan view of the pot and associated parts shown in Fig. 1; and

Fig. 3 is an elevation of one of the detachable lugs used for raising the pot.

Figure 1:
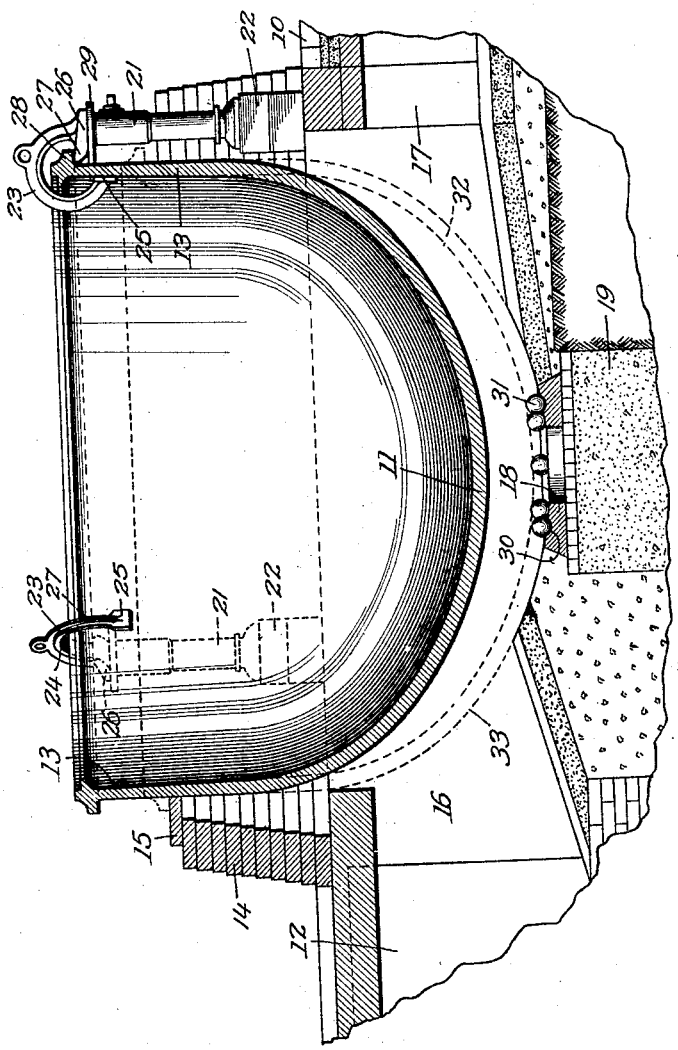
Figure 1 is a vertical section through the furnace, the pot, and its mounting.

Referring to the drawings, 10 represents the floor of the caustic shed, containing a series of caustic pots 11, each with its furnace located at the side, as shown at 12. The bottom of the pot 11 is approximately hemispherical in shape, the upper part of the pot being extended upwardly to constitute a vertically extending cylindrical portion 13. The upper cylindrical portion 13 extends above the floor 10 of the caustic shed and is inclosed in the circular wall 14 of the brick work, or other suitable material, the top of said brick work 14 being capped by a ring 15 of cast iron, or the like. Suitable communicating openings 16 and 17 are provided beneath the pot 11, the bottom portion of which is supported on a cast iron ring or base plate 18. The base plate 18 is carried by the concrete foundation 19.

It will of course be understood that the flame and products of combustion from the furnace 12 pass into the opening 16 around and in contact with the bottom of the pot and into the stack, as is customary in pot furnaces of the character described.

When the pot is in use, the bottom thereof rests upon the ring 18, the upper surface of which ring is made of the same curvature as the bottom of the pot so that the latter will fit same snugly. When it is desired to turn the pot, the brick work of the wall 14 is torn out to the floor level at three equally spaced points, sufficient brick being removed at each point to provide room for a lifting jack 21 of any approved type. If desired, said lifting jack 21 may be supported on blocking 22.

The pot cover having been raised or removed, there is applied to the flanged rim of the pot a series of three detachable lugs 23, each lug being located over its corresponding lifting jack 21. Each of said lugs 23 is of peculiar and special design and comprises a substantially circular portion 24 of the proper cross section to resist the imposed bending strain, said circular portion 24 terminating on the inside of the pot with a small foot 25 and on the outside of the pot with a horizontally extending block 26, said block 26 having an inwardly extending part 27 arranged to fit under the outer flange 28 of the pot rim. The shape of the part 26 is such that when the lug is in the position shown, i. e., with the foot 25 engaging the inner surface of the pot and with the projection 27 engaging the outer flange 28, the lower surface of the part 26 will be substantially horizontal, thereby facilitating the application of the jack 21. If desired, in order to prevent slipping, and to eliminate metal to metal contact, a piece of lumber 29 may be interposed between the detachable lug and the head of the jack 21.

Having properly positioned the jacks and the lugs 23, the jacks are actuated to raise the pot a suitable distance, whereupon access may be had to the top of the cast iron foundation plate 18. After such access is had, it being of course understood that the fires have been withdrawn from the furnace, the bottom of the pot over the ring is cleaned off, as is also the curved seat of the ring 18 and the ball-race 30 formed in said seat. A series of balls 31 are then placed in the ball-race 30, and, by suitably manipulating the jacks, the pot is lowered so that it will rest upon the tops of the said balls 31, as shown at 32. The detachable lugs 23 are then freed from the rim of the pot after further slacking off the jacks 21, and the pot is now ready to be rotated into its new angular position. This is easily effected by a comparatively small manual effort, by reason of the fact that the pot is wholly supported by the balls 31 and the ball circle is of comparatively small diameter. After the pot has been rotated around its vertical axis into the desired new position, the detachable lugs 23 are again applied and the pot is raised by the jacks a sufficient distance to enable the balls to be removed, after which the pot is lowered into its lowermost position 33, resting on the curved portion of the foundation plate 18. The jacks may then be removed and the brick work of the wall 14 restored to its original condition. It will of course be obvious that during, or between the various stages in, the operation of shifting the pot, any needful repairs may be made to the brick work or other parts of the furnace, pot, or pot mounting.

The jacks and the detachable lugs which are employed for the purpose of rotating the pot around its vertical axis while in its setting, may also be utilized for installing a new pot or for moving away an old pot which has become worn out through continued use. When so used for effecting such bodily movement of the pot, the jacks and lugs are arranged in substantially the same manner as when rotating the pot, and the pot, which is always maintained in upright position, is elevated sufficiently to permit of the insertion under the same of a cradle and rollers, upon which the pot may be rolled into its desired position.

The scope of the invention should be determined by reference to the appended claims.

I claim—

1. The method of rotating a circular caldron about its vertical axis, which consists in applying a plurality of jacks to said caldron, jacking up the caldron a sufficient distance to permit the insertion of anti-friction means beneath said caldron and adjacent the center thereof, lowering said caldron until the weight thereof is supported on said anti-friction means, turning said caldron, again jacking up the caldron to permit removal of said anti-friction means, and subsequently lowering said caldron back onto its original support.

2. The improvement in the art of effecting a limited rotary movement of a ponderous flanged caustic pot around its vertical axis, which consists in applying upward pressure to the pot flange at a plurality of spaced apart points and thereby raising the pot from its support, temporarily supporting said pot on anti-friction means readily permitting rotation of said pot into a new position, again raising the post, removing said supporting anti-friction means, and subsequently lowering said pot into its original position.

3. A detachable lifting lug for caustic pots having outwardly projecting flanges, which comprises a substantially C-shaped member, one end of which extends into and engages the inner surface of the pot and the other end of which is located externally of the pot and is provided with an inwardly extending projection adapted to engage under the pot flange, the portion of said member which is external of the pot being provided with an outwardly projecting block suitably arranged to permit convenient application thereto of a jack for applying upward lifting pressure to the rim of said pot.

4. A detachable lifting lug for caustic pots having outwardly projecting flanges, which comprises a substantially C-shaped part, one end of which is provided with a foot engaging the inner surface of the pot and the other end of which is arranged to extend out of the pot and is provided with an inwardly extending projection adapted to engage under the pot flange, said last named end of said lug extending outwardly from said projection a sufficient distance to permit convenient application of a jack for applying upward pressure to the rim of said pot.

FRANK G. WHEELER.